US 6,645,278 B2

(12) United States Patent
Langille et al.

(10) Patent No.: US 6,645,278 B2
(45) Date of Patent: Nov. 11, 2003

(54) INTUMESCENT POWDER

(75) Inventors: Kevin B. Langille, Barrie (CA); Dat T. Nguyen, Oakville (CA); Dwight E. Veinot, Head of St. Margaret's Bay (CA); Jorgen O. Bernt, Barrie (CA)

(73) Assignee: Pyrophobic Systems Ltd., Barrie (CA)

( * ) Notice: Subject to any disclaimer, the term of this patent is extended or adjusted under 35 U.S.C. 154(b) by 0 days.

(21) Appl. No.: 10/188,923

(22) Filed: Jul. 5, 2002

(65) Prior Publication Data
US 2003/0151034 A1 Aug. 14, 2003
(Under 37 CFR 1.47)

Related U.S. Application Data
(60) Provisional application No. 60/334,119, filed on Nov. 30, 2001.

(51) Int. Cl.⁷ .............................. C09D 5/00; C09K 21/02
(52) U.S. Cl. .................... 106/15.05; 106/482; 106/600; 106/601; 106/18.17; 106/18.12; 252/378 R; 252/606
(58) Field of Search ............................. 106/15.05, 600, 106/601, 482, 18.11, 18.12; 252/378 R, 606

(56) References Cited

U.S. PATENT DOCUMENTS
4,888,057 A * 12/1989 Nguyen et al. .......... 106/18.12

OTHER PUBLICATIONS
K. B. Langille et al—Mechanism of dehydration and intumescence of soluble silicates. Part II. Effect of the Cation; Journal of Materials Sciences 26 (1991) 704–710.*

* cited by examiner

Primary Examiner—Elizabeth D. Wood
(74) Attorney, Agent, or Firm—Dowell & Dowell, P.C.

(57) ABSTRACT

An intumescent powder where the molar ratio of $SiO_2$ to $Li_2O+Na_2O+K_2O$ is between 2.20 to 3.70 to 1.00 and the molar ratio of $Li_2O$ to $Li_2O+Na_2O+K_2O$ is 0.20 to 0.35 has an intumescent point of 195° C. or higher and thus will not prematurely intumesce if mixed with another material at temperatures below 195° C. The powder as used is usually dried to 8–12% by weight to moisture for most purposes is ground to 50 to –500 microns. Preferred methods of manufacture comprise taking a source of lithium hydroxide or lithium silicate and a source of sodium silicate to create a powder with ratios as outlined above.

16 Claims, 1 Drawing Sheet

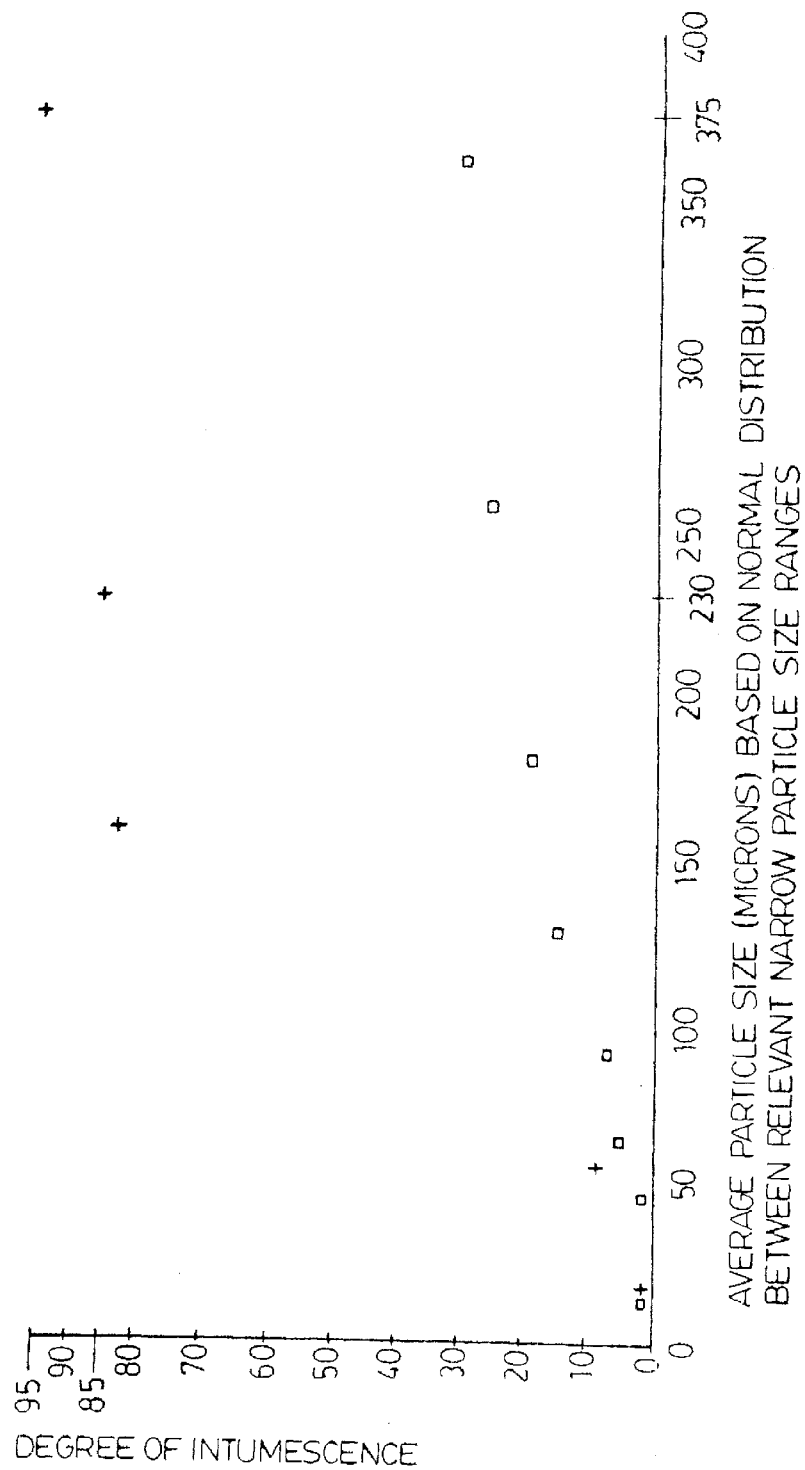

INTUMESCENT POWDER

CROSS REFERENCE TO RELATED APPLICATIONS

This application claims benefit of provisional application Serial No. 60/334,119 filed Nov. 30, 2001.

BACKGROUND OF INVENTION

FIELD OF THE INVENTION

This invention relates to a novel powder having the quality of intumescence at relatively high temperature, the powder having a useful range of formulations, and to the method for its production.

Intumescent powders when heated above their temperature of intumescence, generate a multitude of glassy bubbles and swell to many times their original volume. The intumescent powders are used where such swelling has a useful effect in preventing the spread of fire, closing passages through floors and walls in a fire environment, and other uses.

By 'plastic' herein I refer to the state of a thermoplastic when it may be shaped, molded or formed.

Intumescent powders used in the past were commonly sodium silicate: $xSiO_2:Na_2O$ where 'x' represents the fact that the proportion of $SiO_2$ to $Na_2O$ in such powder may vary. The sodium silicates used began to intumesce at 120° C.–140° C. Thus any binder or matrix material heated to be plastic for mixing with the sodium silicate powder must have had a plastic point below the intumescence point of the silicate to avoid premature intumescence. For thermoplastic materials, this limited the compounds for mixture with the intumescent powders to such materials as: rubber, latex, silicone being materials plastic at or below 120° C.–140° C.

By controlling the $xSiO_2$, a $Li_2O$: $d(Na_2O+K_2O)$ molar ratio as later defined herein and controlling moisture content to about 8%–12% by weight and further to grind the dried powder to between about 50 to 500 microns, we have developed a powder with a high degree of expansion (up to 110 times original size). Intumescence in the novel powder does not occur until about 195° C.–220° C. which is well above the compounding temperature of many thermoplastics at about 170° C.–185° C. For use in the inventive powder, sodium and potassium are almost equivalent on a mole to mole basis so it is not thought necessary to specify them separately, but merely to specify the content by molecular fraction of the sum of the sodium and potassium molar values relative to the other ingredients. (Although most applications require that the powder be ground to 50 to 500 microns we have used the powder ground to as fine as 20 microns for coating fine wire in a suitable vehicle.)

Thus the intumescent powder can be compounded with many thermoplastic materials (e.g. polyethylene, polyvinyl chloride (PVC), and more with plastic temperatures at up to 170° C.–185° C. This has not been achieved before because the silicates formerly used: (sodium silicate and potassium silicate) both begin to intumesce at about 120° C.–140° C.

The ability of sodium and potassium silicates to intumesce at temperatures around 120° C. is well known. Sodium and potassium silicates are water soluble glasses. When they contain 8–15% water, by weight, these glasses begin to soften at about 100° C.–150° C. At about the same time the attached water begins to vaporize. The compound effect is called intumescence which results in the formation of numerous small glass bubbles, or a glass foam.

Lithium silicate, however, intumesces very little. The reason is that hydrated lithium silicate has a much higher softening point (about 230° C.) than do hydrated potassium and sodium silicates. By the time the hydrated lithium silicate softens, much of the water has already vaporized, thus little or no intumescence is possible. (In this new development sodium silicate behaves like potassium silicate mole for mole. Thus the reference is to "sodium and/or potassium silicate" referring to the fact that or that any combination of the two may be used in the correct molar proportion.)

By combining the sodium and/or potassium silicates, on the one hand and lithium silicates on the other, in the molar ratios indicated, we created a hydrated sodium and/or potassium lithium silicate with a softening part of about 195° C.–220° C. This is approximately the temperature at which the water ionically bound to the lithium, is released as water vapor. Because the release of water concurs with the softening point of the sodium and/or potassium with lithium silicate, the resulting intumescence is maximized (an increase in size of up to 80–110 times by volume. (The water originally ionically bound to the sodium, and/or potassium was released beginning at about 120° C. at which time the Na—Li silicate had not yet softened. Consequently little or no intumescence occurs below 195° C.)

This invention provides a powder which intumesces at a temperature of about 195° C.–220° C. Thus the powder may be mixed without intumescence with thermoplastic material having a plastic temperature lower than 195° C. to make a moldable material having the ability to intumesce at temperatures of about 195° C.–220° C. suitable for wide varieties of uses. Suitable thermoplastic materials for this purpose include polyvinyl chloride (PVC) which softens near 175° C., and polyethylene which melts at 165° C. Other thermoplastics with plastic points below 195° C. include ethyl vinyl acetate (EVA), acrylonitrile, butadiene styrene ('ABS') copolymers, polypropylene, acrylic polyethylene, ethyl vinyl alcohol, thermoplastic polyester.

The novel intumescent powder may be mixed with other compounds if desired if this mixing can be done at temperatures less than the intumescence temperature of the powder. The powder may be applied as a coating to metal in a suitable vehicle such as urethane. The intumescent coating on the metal intumesces if the coating is exposed to 195° C.–220° C., and the intumesced powder provides a protective coating for the metal. In a different use, the intumescent powder is combined with a matrix of material. Upon exposure to temperatures above 195° C.–220° C. the powder intumesces and creates a foamed effect in the matrix. This foamed matrix may act as an emergency float in water and hence may be attached to panels or other equipment to create flotation of the equipment in the event the equipment falls into the water.

There is described herein a mixed Li, and Na and/or K alkali silicate powder containing significant lithium oxide, with a high degree of intumescence and a temperature of intumescence above the plastic state temperature of thermoplastic materials, with which the powder is to be mixed, such as those listed above in paragraph [0010].

The alkali silicate powder is a mixed Li/Na and/or K silicate. (For use in the inventive powder sodium and potassium cations have similar behaviour mole by mole as far as the inventive forms as the formulation characteristic is concerned, so that it is not necessary in connection with this invention to specify them separately but merely to specify the content by total molecular weight of the sodium and potassium molar values relative to the content of the other ingredients.

Two main factors influence the characteristics of the mixed Li:Na:K silicates of the invention. One is the silica to cation oxide molar ratio which can be expressed as the ratio y $SiO_2$:$M_2O$ where y is part of the numerator of the ratio when the denominator is 1; and where $M_2O$ (equal to 1) is the total metal oxide which may include a $Li_2O$, b $Na_2O$, and c $K_2O$ when a, b, c are the relative molar quantities of the cation oxides and total 1.00.

The other is the ratio of cation oxide a $Li_2O$: b $Na_2O$: c $K_2O$. The molar fractions of a $Li_2O$, b $Na_2O$, and c $K_2O$ total units as the denominator ($M_2O$=1) for the ratio $SiO_2$:$M_2O$ in the ratio described.

In view of the similarity in effects between sodium and potassium, the molar ratio—a $Li_2O$, b $Na_2O$, and c $K_2O$ may be written as: a $Li_2O$: d($Na_2O$+$K_2O$)(where d is the sum of b and c in moles) and a+d=1.00.

For brevity it is sometimes herein desired to indicate the mixture numerically only. For example a ratio 3.00/0.31:0.33:0.35 shall be read herein to indicate 3.00 $SiO_2$/0.31 $Li_2O$:0.33 $Na_2O$:0.35 $K_2O$ and the ratio 3.00/0.31:0.69 shall be interpreted to indicate the molar ratio 3.00 $SiO_2$/0.31 $Li_2O$:0.69 ($Na_2O$+$K_2O$).

The tests conducted on the water solubility of ternary Li/Na/K silicates indicate that potassium and sodium silicates are similar in solubility.

The formulations of the intumescent powder within the scope of the invention range over the molar ratios (2.20 to 3.70)$SiO_2$/(0.20–0.35)$Li_2O$:(0.80 to 0.65)($Na_2O$+$K_2O$) where the coefficients of $Li_2O$ and ($Na_2O$+$K_2O$) are chosen so that the sum of the coefficients equals 1.00 and where the molar ratios are accurate to plus or minus 2%. The powder is dried to a moisture content of 8–12% and usually ground to 50 to 500 microns.

The formulation ratios are accurate to about 2 parts in 100 which is the commercial standard of accuracy for the materials specified, which constitutes the allowable variation in the molar ratios of the specification and claims.

The preferred limits of the formulations may be commented on as follows. For values of $SiO_2$ below 2.20 the temperature of intumescence is lower than desired. Also the product tends to be less water resistant, and more readily efflorescent and more hygroscopic. For molar values of $SiO_2$ above 3.70 the degree of intumescence is less than desired although there is good water resistance, low efflorescence and less hygroscopic effect.

For values of $Li_2O$ less than 0.20, the main proportion of water remaining after drying (discussed hereafter) is linked to the $Li_2O$, the decrease in the $Li_2O$ below 0.20 contemplated above has a consequent reduction of water so that the remaining water may be insufficient to cause a desirable degree of intumescence.

For values of $Li_2O$ greater than 0.35 the degree of intumescence is reduced below the limits desired for combining with thermoplastics.

BRIEF DESCRIPTION OF THE DRAWING

FIG. 1 shows the degree of intumescence of two useful powders in accord with the invention plotted against average particle size in microns based on normal distribution between relevant narrow particle size ranges.

It should be noted that the degree of intumescence is strongly influenced by the particle size. Very fine powder then has a lower degree of intumescence than somewhat coarser powder.

In FIG. 1 the degree of intumescence is the number of multiples of original particle size achieved during intumescence. Increase of degree of intumescence with increase of particle size is shown in comparison of the graphs of the powder mixtures, Sample (A) 3.62/0.26:0.22:0.52 and Sample (B) 2.48/0.26:0.74:0.00. As indicated the Sample (B) gives a higher degree of intumescence. These are two of the preferred formulations for intumescent powder. Cross points at the upper right of the Sample (B) graph are average particle size 230 microns, degree of intumescence 85 times and average particle size 375 microns, degree of intumescence 95 times.

Tests on the powders of Samples (A) and (B) have indicated an intumescent temperature of 210° C.–220° C. However experience with compounding the respective sample materials indicates problems at temperatures as low as 190° C. due to the vapor coming off the intumescent powder which causes foaming of the plastic. Accordingly 190° C. is treated as the upper limit for the plastic temperature of a thermoplastic to be compounded with the powder. It should also be noted that the moisture may be present over a range of 8–12% and for this reason the temperature of intumescence can vary with moisture content. Higher water content has been found to result in a lower intumescence temperature.

A preferred method for producing a preferred intumescent powder involves taking 0.496 lb of lithium hydroxide (LiOH.$H_2O$) powder and mixing it into 12.0 lbs sodium silicate "N" constituency. The sodium silicate "N" constituency may be obtained from PQ Corporation, Valley Forge, Pa. The LiOH.$H_2O$ may be obtained from Chemetall Foote Corp., Kings, Mountain, N.C.

During the mixing, the LiOH.$H_2O$ partially dissolves the silicate anions in solution resulting in smaller silicate particles. The exact rate of dissolution is not known but a few hours, at least, should be allowed between mixing and placing the materials in trays (about 20 lbs of liquid per tray) to be dried.

One stage drying can be achieved by drying initially at 175° C. for 1.5 hours (higher temperatures will result in excessive boiling of the liquid) and then drying for 8.5 hours at 190° C. The material is thus dried to 8–10% by weight moisture; crushed and screened to the required fineness (50 to 500 microns). The material, after grinding should be sealed from the atmosphere to prevent it from picking up moisture. The resultant formulant intumescent powder has molecular relationship 2.48/0.26:0.74:0.00.

In another preferred method of making the powder the components are 100 lbs of sodium silicate "BW" obtained from The PQ Corporation previously referred to; 36 lbs of water and 163 lbs of liquid lithium silicate obtained from DuPont under its trademark "Lithium Polysilicate". The above methods are mixed, dried to 8–10% by weight moisture, crushed, ground and screened to preferred fineness. The resultant formulant intumescent powder again has the molecular relationship 2.48/0.26:0.74:0.00.

In either of the two methods so far described, after mixing, instead of crushing and grinding, the mixed components may be spray-dried to the required fineness.

By methods closely analagous to that above described other formulants within the desired range may be prepared including a particularly useful formulation 3.62/0.26:0.22:0.52 and other formulations within the inventive range, using selected formulations of sodium and/or potassium silicate., lithium silicate or lithium hydroxide.

In both the above methods sodium silicate may be replaced in whole or in part with potassium silicate. Current pricing favours the use of sodium silicate.

It is noted that it is desirable that the formulations of the invention form in intumescence a solid char structure wherein the glassy bubbles caused by the intumescence adhere to each other so that the resulting solid char forms a unitary structure. If the bubbles do not co-adhere, what was desired to be a 'solid structure' crumbles and falls apart. This could occur with high $SiO_2$ formula such as 3.62/0.26:0.22:0.52, in the absence of corrective measures. To ensure fusing (i.e. co-adhering) of the bubbles, a low melting temperature frit such as borax is included with the formulant, the effect of the frit being to ensure fusing of the glass bubbles during intumescence. The frit does not otherwise affect the character of the formulant.

The formulant with the highest degree of intumescence was obtained with the formulation $SiO_2/Li_2O:Na_2O:K_2O$ giving 2.48/0.26:0.74:0.00. This has a lower glass softening point than those formulations with higher silica content so that it fuses after intumescence to form a solid structure. However it has relatively less resistance to solubility in water, higher efflorescence and more hygroscopic water absorption than formulations with a higher $SiO_2$ content. Thus the (B) formulation is effective when used with a plastic matrix of polyethylene, of PVC, or the like, to shield the compound from contact with water. Powders in accord with the inventive formulations may be dried to a water content that is low enough (i.e. 8–12% moisture by weight) that the remaining water is associated with the lithium cation. This water content can also be achieved on an extended drying time at low temperature, e.g. 90° C. for several weeks or by increasing the temperature below the intumescence temperature for shorter duration. Formulations of the mixed powder have been dried at as high as 190° C. The water associated with the lithium ion is believed to be driven off during intumescence at temperatures between about 195° C. and 220° C. when the hydrated mixed alkali silicate powder is softening. Thus the water can bubble the silicon causing the glass bubbles of intumescence. This temperature point is much lower than the anhydrous mixed alkali silicate softening temperature that results in fusion of the resulting glass bubbles.

We claim:

1. Intumescent powder substantially defined by molar ratios (2.20 to 3.70) $SiO_2$/(0.20 to 0.35) $Li_2O$: (0.65 to 0.80)($Na_2O+K_2O$) where the coefficients of $Li_2O$ on the one hand and of ($Na_2O+K_2O$) on the other total 1:00 where the molar ratios are accurate to within plus or minus 2%.

2. Intumescent powder as claimed in claim 1, wherein the powder has a moisture content of 8–12% by weight.

3. Intumescent powder as claimed in claim 1, of the average size resulting from grinding to a size of 50 to 500 microns.

4. Intumescent powder as claimed in claim 2, of the average size resulting from grinding to a size of 50 to 500 microns.

5. Intumescent powder as claimed in claim 1, with the molar ratio of about 2.48 $SiO_2$/0.26 $Li_2O$:0.74 ($Na_2O+K_2O$).

6. Intumescent powder as claimed in claim 2, with the molar ratio of about 2.48 $SiO_2$/0.26 $Li_2O$:0.74 ($Na_2O+K_2O$).

7. Intumescent powder as claimed in claim 1, with the molar ratio of about 3.62 $SiO_2$/0.26 $Li_2O$:0.74 ($Na_2O+K_2O$).

8. Intumescent powder as claimed in claim 2, with the molar ratio of about 3.62 $SiO_2$/0.26 $Li_2O$:0.74 ($Na_2O+K_2O$).

9. Method of forming an intumescent powder comprising mixing a source for lithium hydroxide or lithium silicate with sodium silicate in quantities to achieve a molar ratio of about (2.20 to 3.70) $SiO_2$/(0.20 to 0.35)$Li_2O$:(0.80 to 0.65)($Na_2O+K_2O$), where the coefficients of $Li_2O$ and ($Na_2O+K_2O$) add to 1.00 and the molar ratios are accurate to plus or minus 2%; and water, and drying the moisture and water to 8–12% by weight, of water.

10. Method as claimed in claim 9, where the dried powder is ground to 50 to 500 microns.

11. Method of forming an intumescent powder as claimed in claim 9, wherein lithium hydroxide powder is mixed with sodium silicate.

12. Method of forming an intumescent powder as claimed in claim 9, wherein liquid lithium silicate is mixed with sodium silicate.

13. Method as claimed in claim 11, where the dried powder is ground to 50 to 500 microns.

14. Method as claimed in claim 12, where the dried powder is ground to 50 to 500 microns.

15. Method of forming an intumescent powder comprising mixing sodium and/or potassium silicate, and lithium silicate with water added if necessary to lower the viscosity, ground to produce (2.20 to 3.70) $SiO_2$/(0.20 to 0.35) $Li_2O$: (0.80 to 0.65)($Na_2O+K_2O$) where the coefficients of $Li_2O$ and ($Na_2O+K_2O$) are chosen so the sum of the coefficients equals 1.00, and where the molar ratios are accurate to plus or minus 2%; dried to a moisture content of 8° to 12° and ground to 50 to 500 microns.

16. Method as claimed in claim 11, where the dried powder is ground to 50 to 500 microns.

* * * * *